Oct. 1, 1957

J. B. CURRIE ET AL 2,808,242

HOMOGENEOUSLY DISTRIBUTING PARTICLES

Filed April 19, 1954

INVENTORS.
John B. Currie and
Alvin R. Gregory.
BY

ATTORNEY:-

United States Patent Office 2,808,242
Patented Oct. 1, 1957

2,808,242

HOMOGENEOUSLY DISTRIBUTING PARTICLES

John B. Currie, Oakmont, and Alvin R. Gregory, Verona, Pa., assignors to Gulf Research & Development Company, Pittsburgh, Pa., a corporation of Delaware Application April 19, 1954, Serial No. 424,114

5 Claims. (Cl. 259—180)

This invention relates to a method of and apparatus for obtaining a homogeneous distribution of particles and for forming particle aggregates having a homogeneous and isotropic distribution of said particles therethrough.

Aggregates of solid particles are of great value in commercial applications and are extensively employed in experimental work. The aggregates of this invention can be used in the formation of gravel packs which are lowered into boreholes of wells, which produce petroleum and other fluids, for the purpose of reducing sanding in such wells. In pebble heaters, whether static or flowing beds are used, the invention can be employed to procure a regularly spaced arrangement of the pebbles therein. Another application is in the packing of chromatographic columns where irregularly shaped particles would probably be employed. Poorly packed columns give rise to channeling and development of a non-planar interface between the chromatographic zones. Application of the present invention would improve the distinctness and detectability of the interface and make possible a closer separation of various eluates and fractions from such a column.

The aggregates are formed, in accordance with the present invention, by allowing the particles, premixed roughly in the desired particle size distribution, to impinge upon a matrix of essentially spherical balls, to travel through the matrix by a number of collisions with the balls, and thereafter to fall into a desired containing unit to form a homogeneously distributed aggregate. More particularly, the desired quantities of particles of selected sizes are mixed, and the mixture is then placed in a reservoir which can be, and preferably is, the uppermost section of a cylindrical column. The reservoir is provided at the bottom with a valve which can be opened or closed as desired. Spaced below the valve and at a distance therefrom is a three-dimensional matrix comprising spherical balls spaced from one another at substantially regular intervals. Spaced below the matrix and at a selected distance therefrom for catching the particles which have passed through the matrix is a container in which the aggregate is formed.

The invention can best be described by reference to the accompanying drawings which are hereby incorporated in and made a part of the present specification.

Figure 1:
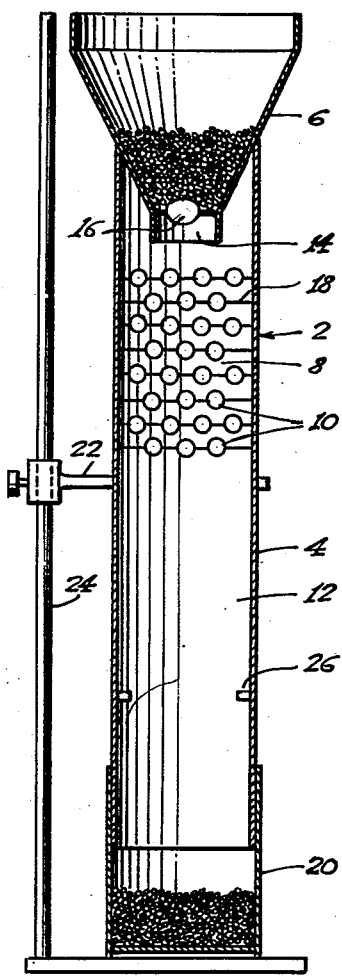
Figure 1 is a vertical cross-section of an apparatus suitable for carrying out our invention.

Referring to Figure 1, reference numeral 2 defines a vertical hollow cylindrical member comprising a cylinder 4, a matrix 8 of essentially spherical balls 10 and a fall column 12. While a cylindrical member is shown and described in the instant embodiment, it is understood that such member can also be of other shapes, such as rectangular, if desired. A reservoir 6 which is shown in the shape of a funnel but which can be of any desired shape, is adapted to contain the mixture of particles which are to be used in forming the aggregate.

The particles of various sizes are roughly premixed before treatment in orer to obtain the full effect of this invention. Premixing could be done either by hand or continuously by apparatus such as a plurality of conveyors carrying different size particles to reservoir 6. As examples of particles which can effectively be treated in accordance with our invention are particles which have diameters whose ratios are about 1:1 to about 10:1 and preferably from about 2:1 to about 6:1. When the mixture being treated contains particles of more than two sizes, the ratios of diameters between any two particles of different sizes should preferably be within the defined range. While different particles having the same diameter can effectively be treated in accordance with our invention and the volumetric ratios of the particles being treated can be varied as desired, the invention will ordinarily be applied to the treatment of particles of different diameters and the volumetric ratio will be such that the larger particles will usually predominate.

The lower portion of reservoir 6 is provided with opening 14 and a rotatable butterfly valve 16 to control the flow of particles therefrom. When valve 16 is in a horizontal position, particles in the reservoir are maintained therein and prevented from flowing through opening 14, and when the valve is in a vertical position the particles are permitted free gravitational flow through opening 14 toward matrix 8. While we have shown a butterfly valve for use in reservoir 6, it is to be understood that other types of valves, e. g., a ball valve, can similarly be employed to control the flow of particles from the reservoir.

Spaced at a distance below reservoir 6 is the matrix 8 composed of balls 10. While balls 10 have been shown to be spherical in shape, it is within the scope of our invention to employ any generally spherical body having a deflective surface in the formation of the matrix. These balls can be made of any desired material but are preferably made of a resilient material such as cork or rubber. The balls in the matrix can be of different sizes if desired but preferably are of the same size throughout the matrix. Balls 10 are suspended within cylinder 4 by any known means but preferably by wires or strings 18 which pierce the balls and also cylinder 4. These balls are preferably substantially equally spaced along the wires or strings and the arrangement is such as to effect a generally regular spacing of the balls in the matrix. While particles flowing through matrix 8 will collide with the wires or strings 18 as well as the spherical balls, the size and number of such wires in the matrix are small and thus the wires will have no detrimental effect on the homogeneity of the aggregate formed.

The size of spherical balls 10 and the distance between them, as well as the depth of matrix 8 formed therefrom, are not arbitrarily chosen but are closely related to the particles being treated and the homogeneity and isotropic qualities desired in the aggregate produced. While the size of the balls is not critical, in general we prefer to employ balls having a diameter of about 6 to about 12 times the diameter of the largest particle in the mixture being treated. Especially preferred are balls having a diameter of about 8 to about 10 times the diameter of the largest particle in the mixture being treated.

The spacing from one ball to another should be small enough to assure frequent collisions of particles therewith, but should not be so small as to permit bridging of the largest particles in the mixture being treated across the interstices between the balls. For best results the minimum distance between bals should be at least twice the diameter of the largest particle in the mixture but no more than about 6 times the diameter of the largest particle. Especially good results are obtained when the distance between balls is about 3 to about 5 times the diameter of the largest particle being treated. Stated in another way the spacing between the balls should be about 0.2 to about 0.6 times, preferably about 0.3 to about 0.5 times, the diameter of the balls. Obviously the balls are not in contact with each other nor with cylinder 4.

While matrix 8 becomes more effective as the depth thereof increases, it is possible in accordance with our invention to obtain satisfactory results with a fairly shallow matrix, provided the balls forming a part thereof are designed and spaced as defined above. Since the matrix of balls imparts randomness to the particle distribution in the aggregate and this randomness is increased in direct proportion to the increase of the number of collisions between the particles and the balls, it is important to provide a matrix of sufficient depth to obtain the desired collisions between the particles and the balls. These results can be obtained with a matrix having a depth of at least 2 times and preferably 5 times the diameter of the matrix.

The particles issuing from the bottom of matrix 8 are then permitted to drop through fall column 12 into receptacle 20 wherein the aggregate is formed. In the embodiment shown, receptacle 20 telescopes outside fall column 12 of cylinder 4.

The research work leading to the development of this invention indicates that the distance between the bottom of matrix 8 and the top of the aggregate which is forming in receptacle 20 is important for maximum homogeneity of the aggregate. While the distance between the bottom of the matrix and the aggregate which is forming can be varied as desired, we have found that for best results the distance between the bottom of the matrix and the aggregate which is forming should be about 3 to about 10, preferably about 6.5, times the diameter of cylinder 4 or matrix 8.

In order to maintain the desired distance between the bottom of matrix 8 and the aggregate which is forming in receptacle 20, cylinder 4 and receptacle 20 are moved longitudinally relative to each other. In the embodiment shown this is done by maintaining receptacle 20 stationary and moving cylinder 4 away from receptacle 20. As shown, cylinder 4 is held by clamp 22 which is movable on base 24 in the usual way and can be fixedly attached thereto at any desired point. In the instant embodiment, receptacle 20 is telescoped outside cylinder 4 and the cylinder is mounted so that the distance between the bottom of matrix 8 and the bottom of receptacle 20 can be as varied as desired. After an increment of particles is passed through matrix 8 and the formation of the aggregate is started in receptacle 20, cylinder 4 is moved vertically an amount so as to maintain the desired, substantially constant distance between the bottom of the matrix and the aggregate which is forming. Another increment of particles is then passed through the matrix, after which cylinder 4 is moved as before. This operation is continued and the distance is maintained within the limits defined above between the bottom of the matrix and the aggregate which is forming until the aggregate has been completed. Receptacle 20 containing the finished aggregate can then be removed for use.

While the embodiment shown operates intermittently, it is within the scope of our inventon to operate our invention continuously. Thus, the particle mixture can be continuously passed to the reservoir and discharged therefrom and means, such as electrical, mechanical or hydraulic means, can be employed to continuously move cylinder 4 relative to receptacle 20 so as to maintain the distance between the bottom of matrix 8 and the aggregate which is forming as defined above throughout the period of formation of the aggregate.

The impact of the particles with the wall of cylinder 4 in fall section 12 has a tendency to disrupt the distribution of the particles falling therethrough adjacent the wall surface. The particles contacting the cylinder wall do not necessarily bounce off the wall into the main stream of particles but have some tendency to slide down the wall surface and accumulate at the bottom thereof and form a non-isotropic aggregate formation. In order to minimize or substantially eliminate this wall effect, the wall of cylinder 4 is provided with an annular baffle 26, which can be disposed about two-thirds of the distance between the matrix and the aggregate which is forming and which disrupts the flow of particles along the sides of the fall column and throws them into the main stream of particles in the fall column. The resulting aggregate is one having a homogeneous and isotropic distribution of particles therethrough.

The following example illustrates an operation in accordance with our invention.

Figure 2:
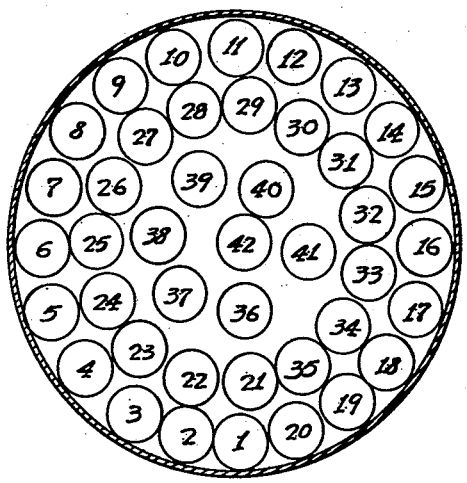
Figure 2 is a horizontal cross-section taken through test tubes employed as containers in the formation of an aggregate in accordance with our invention.

The mixture treated contained glass beads having diameters of 3.0 millimeters and 0.7 millimeter in the volumetric proportion proportion of 57.8 percent of beads of the larger size to 42.2 percent of beads of the smaller size. The cylindrical column used was similar to that described above and had a diameter of 10.16 centimeters. The matrix in the cylinder contained cork balls each having a diameter of 21 millimeters, spaced about 27 millimeters from center to center, with the matrix being 20 centimeters in depth. The distance between the top of the aggregate which was forming and the bottom was varied, and it was found that a homogeneous, isotropic distribution of the glass balls in the aggregate was obtained when this distance was 65 centimeters. The method used in evaluating the homogeneity and isotropy of the distribution was to divide the collecting unit into a number of sub-containers by vertical positions. This was done by packing test tubes vertically into the container at the bottom of the cylinder. The distance between the bottom of the matrix and the top of the aggregate was 65 centimeters or 6.4 times the diameter of the matrix. The two sizes of beads of known density in each test tube were separated and weighed. The volumetric proportion of each size bead was then calculated from the density-weight relationship. The location of the test tubes is shown in Figure 2. Table I below is a tabulation of the sets of data which were obtained in this test.

TABLE I

*Distribution of 3 mm. and 0.70 mm. glass spheres in the aggregate*

| Tube No. | Percent by Volume | | Departure from Average Percent |
|---|---|---|---|
| | 3 mm. | 0.7 mm. | |
| 1 | 70.2 | 29.8 | +1.85 |
| 2 | 71.1 | 28.9 | +2.75 |
| 3 | 71.4 | 28.6 | +3.05 |
| 4 | 71.3 | 28.7 | +2.95 |
| 5 | 70.9 | 29.1 | +2.55 |
| 6 | 72.0 | 28.0 | +3.65 |
| 7 | 67.3 | 32.7 | −1.05 |
| 8 | 72.1 | 27.9 | +3.75 |
| 9 | 66.7 | 33.3 | −1.65 |
| 10 | 71.5 | 28.5 | +3.15 |
| 11 | 67.5 | 32.5 | −0.85 |
| 12 | 70.0 | 30.0 | +1.65 |
| 13 | 71.4 | 28.6 | +3.05 |
| 14 | 69.5 | 30.5 | +1.15 |
| 15 | 72.4 | 27.6 | +4.05 |
| 16 | 70.7 | 29.3 | +2.35 |
| 17 | 66.7 | 33.3 | −1.65 |
| 18 | 69.4 | 30.6 | +1.05 |
| 19 | 70.7 | 29.3 | +2.35 |
| 20 | 66.7 | 33.3 | −1.65 |
| 21 | 65.8 | 34.2 | −2.55 |
| 22 | 66.5 | 33.5 | −1.85 |
| 23 | 67.1 | 32.9 | −1.25 |
| 24 | 65.9 | 34.1 | −2.45 |
| 25 | 65.1 | 34.9 | −3.25 |
| 26 | 64.8 | 35.2 | −3.55 |
| 27 | 64.3 | 35.7 | −4.05 |
| 28 | 68.6 | 31.4 | +0.25 |
| 29 | 69.2 | 30.8 | +0.85 |
| 30 | 68.0 | 32.0 | −0.35 |
| 31 | 70.3 | 29.7 | +1.95 |
| 32 | 71.0 | 29.0 | +2.65 |
| 33 | 65.8 | 34.2 | −2.55 |
| 34 | 65.2 | 34.8 | −3.15 |
| 35 | 69.2 | 30.8 | +0.85 |
| 36 | 71.1 | 28.9 | +2.75 |
| 37 | 65.7 | 34.3 | −2.65 |
| 38 | 65.5 | 34.5 | −2.85 |
| 39 | 65.6 | 34.4 | −2.75 |
| 40 | 64.8 | 35.2 | −3.55 |
| 41 | 64.5 | 35.5 | −3.85 |
| 42 | 67.3 | 32.7 | −1.05 |

Average of 3 mm. glass spheres: 68.35 percent.

It can be seen from table I that the distribution of the beads in each of the 42 test tubes was uniform and that in no case was the departure of the larger balls from the average of 68.35 percent by more than 4.05 percent. Aggregates prepared by the most carefully controlled rotary stirring or vertical probing of the mixture with a rod or similar implement can show a departure from the average of 15 to 20 percent.

Figure 3:
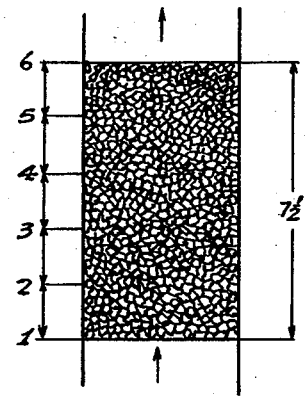
Figure 3 is a vertical cross-section of a portion of a packed column or aggregate prepared in accordance with our invention and employed in testing the homogeneity thereof.

As a further test of the homogeneity of the aggregate formed in the above example, we have measured the pressure drops across five 1.5-inch, vertically spaced sections of the aggregate by passing a mineral oil having a viscosity of 0.1222 poises and a density of 0.8666 through it from bottom to top. The flow rate of the oil was 4.369 cubic centimeters per second and the linear flow velocity was 0.0344 centimeter per second. The aggregate is shown in Figure 3 and illustrates the points at which pressure readings were taken. The data obtained in the run are set forth below in Table II.

TABLE II

*Pressure drops across sections of aggregate*

| Pressure Points | P, gms./cm.² |
|---|---|
| 1-2 | 4.13 |
| 2-3 | 3.62 |
| 3-4 | 3.78 |
| 4-5 | 3.61 |
| 5-6 | 3.57 |

It can be seen from the data in Table II that the pressure drops were approximately the same across each section, indicating that the aggregate was fairly homogeneous throughout. The higher pressure at the bottom of the column is not due to the composition of the aggregate but to supporting cloth and wire screens at pressure point 1.

Obviously many modifications and variations of the invention as hereinabove set forth may be made without departing from the spirit and scope thereof, and therefore only such limitations should be imposed as are indicated in the appended claims.

We claim:

1. An apparatus for obtaining an essentially homogeneous distribution of particles and for forming a particle aggregate having a homogeneous and isotropic distribution of said particles therethrough comprising a hollow cylindrical member, a reservoir at the upper end thereof provided with valve means for controlling the flow of particles therefrom, a matrix comprising spherical balls within said cylindrical member below said reservoir and connecting means between the balls and between the balls and the walls of the cylindrical member to hold each of said balls in spaced relationship and so that no ball is in contact with any other ball or with said cylindrical member.

2. An apparatus for obtaining an essentially homogeneous distribution of particles and for forming a particle aggregate having a homogeneous and isotropic distribution of said particles therethrough, comprising a hollow cylindrical member, a reservoir at the upper end thereof provided with valve means for controlling the flow of particles therefrom, a matrix disposed within said cylindrical member below said reservoir comprising essentially spherical balls spaced from each other a distance of about 0.2 to about 0.6 times the diameter of said balls and connecting means between the balls and between the balls and the walls of the cylindrical member to hold each of said balls in spaced relationship and so that no ball is in contact with any other ball or with said cylindrical member.

3. An apparatus for obtaining an essentially homogeneous distribution of particles and for forming a particle aggregate having a homogeneous and isotropic distribution of said particles therethrough, comprising a hollow cylindrical member, a reservoir at the upper end thereof provided with valve means for controlling the flow of particles therefrom, a matrix disposed within said cylindrical member below said reservoir comprising essentially spherical balls spaced from each other a distance of about 0.2 to about 0.6 times the diameter of said balls, said matrix having a depth of at least 2 times its diameter and connecting means between the balls and between the balls and the walls of the cylindrical member to hold each of said balls in spaced relationship and so that no ball is in contact with any other ball or with said cylindrical member.

4. An apparatus for obtaining an essentially homogeneous distribution of particles and for forming a particle aggregate having a homogeneous and isotropic distribution of said particles therethrough, comprising a hollow cylindrical member, a reservoir at the upper end thereof provided with valve means for controlling the flow of particles therefrom, a matrix disposed within said cylindrical member below said reservoir comprising essentially spherical balls spaced from each other a distance of about 0.2 to about 0.6 times the diameter of said balls, said matrix having a depth of at least 2 times its diameter, and a containing unit spaced a sufficient distance away from said matrix to permit said particles passing through said matrix to fall a distance of about 3 to about 10 times the diameter of the matrix, and means for moving said hollow cylindrical member and said containing unit relative to each other to permit said fall distance to remain substantially constant.

5. An apparatus for obtaining an essentially homogeneous distribution of particles and for forming a particle aggregate having a homogeneous and istotropic distribution of said particles therethrough, comprising a hollow cylindrical member, a reservoir at the upper end thereof provided with valve means for controlling the flow of particles therefrom, a matrix disposed within said cylindrical member below said reservoir comprising essentially spherical balls spaced from each other a distance of about 0.2 to about 0.6 times the diameter of said balls, means mounted below said matrix to throw a portion of the stream of particles passing through said matrix into said stream, and a containing unit spaced below said latter means and a sufficient distance away from said matrix to permit said particles passing through said matrix to fall a distance of about 3 to about 10 times the diameter of the matrix, and means for moving said hollow cylindrical member and said containing unit relative to each other to permit said fall distance to remain substantially constant.

References Cited in the file of this patent

UNITED STATES PATENTS

| | | |
|---|---|---|
| 1,473,165 | Steigmeyer | Nov. 6, 1923 |
| 2,123,033 | Zuckerman | July 5, 1938 |

FOREIGN PATENTS

| | | |
|---|---|---|
| 742,209 | France | Mar. 2, 1933 |